(12) United States Patent
Gorrell et al.

(10) Patent No.: US 7,554,083 B2
(45) Date of Patent: Jun. 30, 2009

(54) INTEGRATION OF ELECTROMAGNETIC DETECTOR ON INTEGRATED CHIP

(75) Inventors: Jonathan Gorrell, Gainesville, FL (US);
Mark Davidson, Florahome, FL (US);
Jean Tokarz, Hawthorne, FL (US); Lev Gasparov, Gainesville, FL (US)

(73) Assignee: Virgin Islands Microsystems, Inc., St. Thomas, VI (US)

( * ) Notice: Subject to any disclaimer, the term of this patent is extended or adjusted under 35 U.S.C. 154(b) by 307 days.

(21) Appl. No.: 11/418,244

(22) Filed: May 5, 2006

(65) Prior Publication Data
US 2007/0258690 A1 Nov. 8, 2007

(51) Int. Cl.
*H01J 3/26* (2006.01)
*H04B 10/06* (2006.01)

(52) U.S. Cl. ............... 250/336.1; 250/397; 398/202
(58) Field of Classification Search ............... 250/200, 250/206, 214, 214.1, 239, 336.1, 393, 396, 250/397; 398/202
See application file for complete search history.

(56) References Cited

U.S. PATENT DOCUMENTS

| | | | |
|---|---|---|---|
| 1,948,384 | A | 2/1934 | Lawrence |
| 2,307,086 | A | 1/1943 | Varian et al. |
| 2,397,905 | A | 4/1946 | Rockwell et al. |
| 2,431,396 | A | 11/1947 | Hansell |
| 2,473,477 | A | 6/1949 | Smith |
| 2,634,372 | A | 4/1953 | Salisbury |
| 2,932,798 | A | 4/1960 | Kerst et al. |
| 2,944,183 | A | 7/1960 | Drexler |
| 2,966,611 | A | 12/1960 | Sandstrom |
| 3,231,779 | A | 1/1966 | White |
| 3,543,147 | A | 11/1970 | Kovarik |
| 3,571,642 | A | 3/1971 | Westcott |
| 3,586,899 | A | 6/1971 | Fleisher |

(Continued)

FOREIGN PATENT DOCUMENTS

EP 0237559 B1 12/1991

(Continued)

OTHER PUBLICATIONS

Search Report and Written Opinion mailed Aug. 24, 2007 in PCT Appln. No. PCT/US2006/022768.

(Continued)

*Primary Examiner*—David Mis
(74) *Attorney, Agent, or Firm*—Davidson Berquist Jackson & Gowdey LLP (57) ABSTRACT

A device includes an integrated circuit (IC) and at least one ultra-small resonant structure and a detection mechanism are formed on said IC. At least the ultra-small resonant structure portion of the device is vacuum packaged. The ultra-small resonant structure includes a plasmon detector having a transmission line. The detector mechanism includes a generator mechanism constructed and adapted to generate a beam of charged particles along a path adjacent to the transmission line; and a detector microcircuit disposed along said path, at a location after said beam has gone past said line, wherein the generator mechanism and the detector microcircuit are disposed adjacent transmission line and wherein a beam of charged particles from the generator mechanism to the detector microcircuit electrically couples a plasmon wave traveling along the metal transmission line to the microcircuit. The detector mechanism may be electrically connected to the underlying IC.

19 Claims, 2 Drawing Sheets

U.S. PATENT DOCUMENTS

| | | |
|---|---|---|
| 3,761,828 A | 9/1973 | Pollard et al. |
| 3,886,399 A | 5/1975 | Symons |
| 3,923,568 A | 12/1975 | Bersin |
| 3,989,347 A | 11/1976 | Eschler |
| 4,053,845 A | 10/1977 | Gould |
| 4,282,436 A | 8/1981 | Kapetanakos et al. |
| 4,450,554 A | 5/1984 | Steensma et al. |
| 4,482,779 A | 11/1984 | Anderson |
| 4,528,659 A | 7/1985 | Jones, Jr. |
| 4,589,107 A | 5/1986 | Middleton et al. |
| 4,598,397 A | 7/1986 | Nelson et al. |
| 4,630,262 A | 12/1986 | Callens et al. |
| 4,652,703 A | 3/1987 | Lu et al. |
| 4,661,783 A | 4/1987 | Gover et al. |
| 4,704,583 A | 11/1987 | Gould |
| 4,712,042 A | 12/1987 | Hamm |
| 4,713,581 A | 12/1987 | Haimson |
| 4,727,550 A | 2/1988 | Chang et al. |
| 4,740,963 A | 4/1988 | Eckley |
| 4,740,973 A | 4/1988 | Madey et al. |
| 4,746,201 A | 5/1988 | Gould |
| 4,761,059 A | 8/1988 | Yeh et al. |
| 4,782,485 A | 11/1988 | Gollub |
| 4,806,859 A | 2/1989 | Hetrick |
| 4,809,271 A | 2/1989 | Kondo et al. |
| 4,813,040 A | 3/1989 | Futato |
| 4,819,228 A | 4/1989 | Baran et al. |
| 4,829,527 A | 5/1989 | Wortman et al. |
| 4,838,021 A | 6/1989 | Beattie |
| 4,841,538 A | 6/1989 | Yanabu et al. |
| 4,864,131 A | 9/1989 | Rich et al. |
| 4,866,704 A | 9/1989 | Bergman |
| 4,866,732 A | 9/1989 | Carey et al. |
| 4,873,715 A | 10/1989 | Shibata |
| 4,887,265 A | 12/1989 | Felix |
| 4,890,282 A | 12/1989 | Lambert et al. |
| 4,898,022 A | 2/1990 | Yumoto et al. |
| 4,912,705 A | 3/1990 | Paneth et al. |
| 4,932,022 A | 6/1990 | Keeney et al. |
| 4,981,371 A | 1/1991 | Gurak et al. |
| 5,023,563 A | 6/1991 | Harvey et al. |
| 5,036,513 A | 7/1991 | Greenblatt |
| 5,065,425 A | 11/1991 | Lecomte et al. |
| 5,113,141 A | 5/1992 | Swenson |
| 5,121,385 A | 6/1992 | Tominaga et al. |
| 5,127,001 A | 6/1992 | Steagall et al. |
| 5,128,729 A | 7/1992 | Alonas et al. |
| 5,130,985 A | 7/1992 | Kondo et al. |
| 5,150,410 A | 9/1992 | Bertrand |
| 5,155,726 A | 10/1992 | Spinney et al. |
| 5,157,000 A | 10/1992 | Elkind et al. |
| 5,163,118 A | 11/1992 | Lorenzo et al. |
| 5,185,073 A | 2/1993 | Bindra et al. |
| 5,187,591 A | 2/1993 | Guy et al. |
| 5,199,918 A | 4/1993 | Kumar |
| 5,214,650 A | 5/1993 | Renner et al. |
| 5,233,623 A | 8/1993 | Chang |
| 5,235,248 A | 8/1993 | Clark et al. |
| 5,262,656 A | 11/1993 | Blondeau et al. |
| 5,263,043 A | 11/1993 | Walsh |
| 5,268,693 A | 12/1993 | Walsh |
| 5,268,788 A | 12/1993 | Fox et al. |
| 5,282,197 A | 1/1994 | Kreitzer |
| 5,283,819 A | 2/1994 | Glick et al. |
| 5,302,240 A | 4/1994 | Hori et al. |
| 5,305,312 A | 4/1994 | Fornek et al. |
| 5,341,374 A | 8/1994 | Lewen et al. |
| 5,354,709 A | 10/1994 | Lorenzo et al. |
| 5,446,814 A | 8/1995 | Kuo et al. |
| 5,504,341 A | 4/1996 | Glavish |
| 5,578,909 A | 11/1996 | Billen |
| 5,608,263 A | 3/1997 | Drayton et al. |
| 5,663,971 A | 9/1997 | Carlsten |
| 5,666,020 A | 9/1997 | Takemura |
| 5,668,368 A | 9/1997 | Sakai et al. |
| 5,705,443 A | 1/1998 | Stauf et al. |
| 5,737,458 A | 4/1998 | Wojnarowski et al. |
| 5,744,919 A | 4/1998 | Mishin et al. |
| 5,757,009 A | 5/1998 | Walstrom |
| 5,767,013 A | 6/1998 | Park et al. |
| 5,790,585 A | 8/1998 | Walsh |
| 5,811,943 A | 9/1998 | Mishin et al. |
| 5,821,836 A | 10/1998 | Katehi et al. |
| 5,821,902 A | 10/1998 | Keen |
| 5,825,140 A | 10/1998 | Fujisawa |
| 5,831,270 A | 11/1998 | Nakasuji |
| 5,847,745 A | 12/1998 | Shimizu et al. |
| 5,889,449 A | 3/1999 | Fiedziuszko |
| 5,889,797 A | 3/1999 | Nguyen |
| 5,902,489 A | 5/1999 | Yasuda et al. |
| 5,963,857 A | 10/1999 | Greywall |
| 6,008,496 A | 12/1999 | Winefordner et al. |
| 6,040,625 A | 3/2000 | Ip |
| 6,060,833 A | 5/2000 | Velazco |
| 6,080,529 A | 6/2000 | Ye et al. |
| 6,139,760 A | 10/2000 | Shim et al. |
| 6,180,415 B1 | 1/2001 | Schultz et al. |
| 6,195,199 B1 | 2/2001 | Yamada |
| 6,222,866 B1 | 4/2001 | Seko |
| 6,278,239 B1 | 8/2001 | Caporaso et al. |
| 6,281,769 B1 | 8/2001 | Fiedziuszko |
| 6,297,511 B1 | 10/2001 | Syllaios et al. |
| 6,301,041 B1 | 10/2001 | Yamada |
| 6,316,876 B1 | 11/2001 | Tanabe |
| 6,338,968 B1 | 1/2002 | Hefti |
| 6,370,306 B1 | 4/2002 | Sato et al. |
| 6,373,194 B1 | 4/2002 | Small |
| 6,376,258 B2 | 4/2002 | Hefti |
| 6,407,516 B1 | 6/2002 | Victor |
| 6,441,298 B1 | 8/2002 | Thio |
| 6,448,850 B1 | 9/2002 | Yamada |
| 6,453,087 B2 | 9/2002 | Frish et al. |
| 6,470,198 B1 | 10/2002 | Kintaka et al. |
| 6,504,303 B2 | 1/2003 | Small |
| 6,525,477 B2 | 2/2003 | Small |
| 6,534,766 B2 | 3/2003 | Abe et al. |
| 6,545,425 B2 | 4/2003 | Victor |
| 6,552,320 B1 | 4/2003 | Pan |
| 6,577,040 B2 | 6/2003 | Nguyen |
| 6,603,915 B2 | 8/2003 | Glebov et al. |
| 6,624,916 B1 | 9/2003 | Green et al. |
| 6,636,185 B1 | 10/2003 | Spitzer et al. |
| 6,636,653 B2 | 10/2003 | Miracky et al. |
| 6,640,023 B2 | 10/2003 | Miller et al. |
| 6,642,907 B2 | 11/2003 | Hamada et al. |
| 6,687,034 B2 | 2/2004 | Wine et al. |
| 6,724,486 B1 | 4/2004 | Shull et al. |
| 6,738,176 B2 | 5/2004 | Rabinowitz et al. |
| 6,741,781 B2 | 5/2004 | Furuyama |
| 6,782,205 B2 | 8/2004 | Trisnadi et al. |
| 6,791,438 B2 | 9/2004 | Takahashi et al. |
| 6,800,877 B2 | 10/2004 | Victor et al. |
| 6,801,002 B2 | 10/2004 | Victor et al. |
| 6,829,286 B1 | 12/2004 | Guilfoyle et al. |
| 6,834,152 B2 | 12/2004 | Gunn et al. |
| 6,870,438 B1 | 3/2005 | Shino et al. |
| 6,871,025 B2 | 3/2005 | Maleki et al. |
| 6,885,262 B2 | 4/2005 | Nishimura et al. |
| 6,909,092 B2 | 6/2005 | Nagahama |
| 6,909,104 B1 | 6/2005 | Koops et al. |
| 6,943,650 B2 | 9/2005 | Ramprasad et al. |
| 6,944,369 B2 | 9/2005 | Deliwala |
| 6,953,291 B2 | 10/2005 | Liu |
| 6,954,515 B2 | 10/2005 | Bjorkholm et al. |

| | | |
|---|---|---|
| 6,965,284 B2 | 11/2005 | Maekawa et al. |
| 6,965,625 B2 | 11/2005 | Mross et al. |
| 6,972,439 B1 | 12/2005 | Kim et al. |
| 6,995,406 B2 | 2/2006 | Tojo et al. |
| 7,010,183 B2 | 3/2006 | Estes et al. |
| 7,064,500 B2 | 6/2006 | Victor et al. |
| 7,068,948 B2 | 6/2006 | Wei et al. |
| 7,092,588 B2 | 8/2006 | Kondo |
| 7,092,603 B2 | 8/2006 | Glebov et al. |
| 7,122,978 B2 | 10/2006 | Nakanishi et al. |
| 7,130,102 B2 | 10/2006 | Rabinowitz |
| 7,177,515 B2 | 2/2007 | Estes et al. |
| 7,230,201 B1 | 6/2007 | Miley et al. |
| 7,253,426 B2 | 8/2007 | Gorrell et al. |
| 7,267,459 B2 | 9/2007 | Matheson |
| 7,267,461 B2 | 9/2007 | Kan et al. |
| 7,309,953 B2 | 12/2007 | Tiberi et al. |
| 7,342,441 B2 | 3/2008 | Gorrell et al. |
| 7,362,972 B2 | 4/2008 | Yavor et al. |
| 7,375,631 B2 | 5/2008 | Moskowitz et al. |
| 7,436,177 B2 | 10/2008 | Gorrell et al. |
| 7,442,940 B2 | 10/2008 | Gorrell et al. |
| 7,443,358 B2 | 10/2008 | Gorrell et al. |
| 7,470,920 B2 | 12/2008 | Gorrell et al. |
| 7,473,917 B2 | 1/2009 | Singh |
| 2001/0025925 A1 | 10/2001 | Abe et al. |
| 2002/0009723 A1 | 1/2002 | Hefti |
| 2002/0027481 A1 | 3/2002 | Fiedziuszko |
| 2002/0036121 A1 | 3/2002 | Ball et al. |
| 2002/0036264 A1 | 3/2002 | Nakasuji et al. |
| 2002/0053638 A1 | 5/2002 | Winkler et al. |
| 2002/0068018 A1 | 6/2002 | Pepper et al. |
| 2002/0070671 A1 | 6/2002 | Small |
| 2002/0071457 A1 | 6/2002 | Hogan |
| 2002/0135665 A1 | 9/2002 | Gardner |
| 2003/0010979 A1 | 1/2003 | Pardo et al. |
| 2003/0012925 A1 | 1/2003 | Gorrell |
| 2003/0016412 A1 | 1/2003 | Small |
| 2003/0016421 A1 | 1/2003 | Small |
| 2003/0034535 A1 | 2/2003 | Barenburu et al. |
| 2003/0103150 A1 | 6/2003 | Catrysse et al. |
| 2003/0155521 A1 | 8/2003 | Feuerbaum |
| 2003/0158474 A1 | 8/2003 | Scherer et al. |
| 2003/0164947 A1 | 9/2003 | Vaupel |
| 2003/0179974 A1 | 9/2003 | Estes et al. |
| 2003/0206708 A1 | 11/2003 | Estes et al. |
| 2003/0214695 A1 | 11/2003 | Abramson et al. |
| 2004/0061053 A1 | 4/2004 | Taniguchi et al. |
| 2004/0080285 A1 | 4/2004 | Victor et al. |
| 2004/0085159 A1 | 5/2004 | Kubena et al. |
| 2004/0108471 A1 | 6/2004 | Luo et al. |
| 2004/0108473 A1 | 6/2004 | Melnychuk et al. |
| 2004/0136715 A1 | 7/2004 | Kondo |
| 2004/0150991 A1 | 8/2004 | Ouderkirk et al. |
| 2004/0171272 A1 | 9/2004 | Jin et al. |
| 2004/0180244 A1 | 9/2004 | Tour et al. |
| 2004/0184270 A1 | 9/2004 | Halter |
| 2004/0213375 A1 | 10/2004 | Bjorkholm et al. |
| 2004/0217297 A1 | 11/2004 | Moses et al. |
| 2004/0218651 A1 | 11/2004 | Iwasaki et al. |
| 2004/0231996 A1 | 11/2004 | Webb |
| 2004/0240035 A1 | 12/2004 | Zhilkov |
| 2004/0264867 A1 | 12/2004 | Kondo |
| 2005/0023145 A1 | 2/2005 | Cohen et al. |
| 2005/0045821 A1 | 3/2005 | Noji et al. |
| 2005/0045832 A1 | 3/2005 | Kelly et al. |
| 2005/0054151 A1 | 3/2005 | Lowther et al. |
| 2005/0067286 A1 | 3/2005 | Ahn et al. |
| 2005/0082469 A1 | 4/2005 | Carlo |
| 2005/0092929 A1 | 5/2005 | Schneiker |
| 2005/0104684 A1 | 5/2005 | Wojcik |
| 2005/0105690 A1 | 5/2005 | Pau et al. |
| 2005/0145882 A1 | 7/2005 | Taylor et al. |
| 2005/0162104 A1 | 7/2005 | Victor et al. |
| 2005/0190637 A1 | 9/2005 | Ichimura et al. |
| 2005/0194258 A1 | 9/2005 | Cohen et al. |
| 2005/0201707 A1 | 9/2005 | Glebov et al. |
| 2005/0201717 A1 | 9/2005 | Matsumura et al. |
| 2005/0212503 A1 | 9/2005 | Deibele |
| 2005/0231138 A1 | 10/2005 | Nakanishi et al. |
| 2005/0249451 A1 | 11/2005 | Baehr-Jones et al. |
| 2005/0285541 A1 | 12/2005 | LeChevalier |
| 2006/0007730 A1 | 1/2006 | Nakamura et al. |
| 2006/0018619 A1 | 1/2006 | Helffrich et al. |
| 2006/0035173 A1 | 2/2006 | Davidson et al. |
| 2006/0045418 A1 | 3/2006 | Cho et al. |
| 2006/0060782 A1 | 3/2006 | Khursheed |
| 2006/0062258 A1 | 3/2006 | Brau et al. |
| 2006/0131695 A1 | 6/2006 | Kuekes et al. |
| 2006/0159131 A1 | 7/2006 | Liu et al. |
| 2006/0164496 A1 | 7/2006 | Tokutake et al. |
| 2006/0208667 A1 | 9/2006 | Lys et al. |
| 2006/0216940 A1 | 9/2006 | Gorrell et al. |
| 2006/0243925 A1 | 11/2006 | Barker et al. |
| 2006/0274922 A1 | 12/2006 | Ragsdale |
| 2007/0003781 A1 | 1/2007 | de Rochemont |
| 2007/0013765 A1 | 1/2007 | Hudson et al. |
| 2007/0075264 A1 | 4/2007 | Gorrell et al. |
| 2007/0086915 A1 | 4/2007 | LeBoeuf et al. |
| 2007/0116420 A1 | 5/2007 | Estes et al. |
| 2007/0146704 A1 | 6/2007 | Schmidt et al. |
| 2007/0194357 A1 | 8/2007 | Oohashi |
| 2007/0200940 A1 | 8/2007 | Gruhlke et al. |
| 2007/0252983 A1 | 11/2007 | Tong et al. |
| 2007/0258689 A1 | 11/2007 | Gorrell et al. |
| 2007/0258690 A1* | 11/2007 | Gorrell et al. ............... 385/131 |
| 2007/0264023 A1 | 11/2007 | Gorrell et al. |
| 2007/0284527 A1 | 12/2007 | Zani et al. |
| 2008/0069590 A1 | 3/2008 | Gorrell et al. |
| 2008/0302963 A1 | 12/2008 | Nakasuji et al. |

FOREIGN PATENT DOCUMENTS

| | | |
|---|---|---|
| JP | 2004-32323 A | 1/2004 |
| WO | WO 87/01873 | 3/1987 |
| WO | WO 93/21663 A1 | 10/1993 |
| WO | WO 00/72413 | 11/2000 |
| WO | WO 02/25785 | 3/2002 |
| WO | WO 02/077607 | 10/2002 |
| WO | WO 2004/086560 | 10/2004 |
| WO | WO 2005/015143 A2 | 2/2005 |
| WO | WO 2005/098966 | 10/2005 |
| WO | WO 2006/042239 A2 | 4/2006 |
| WO | WO 2007/081389 | 7/2007 |
| WO | WO 2007/081390 | 7/2007 |
| WO | WO 2007/081391 | 7/2007 |

OTHER PUBLICATIONS

Search Report and Written Opinion mailed Aug. 31, 2007 in PCT Appln. No. PCT/US2006/022680.
Search Report and Written Opinion mailed Jul. 16, 2007 in PCT Appln. No. PCT/US2006/022774.
Search Report and Written Opinion mailed Jul. 20, 2007 in PCT Appln. No. PCT/US2006/024216.
Search Report and Written Opinion mailed Jul. 26, 2007 in PCT Appln. No. PCT/US2006/022776.
Search Report and Written Opinion mailed Jun. 20, 2007 in PCT Appln. No. PCT/US2006/022779.
Search Report and Written Opinion mailed Sep. 12, 2007 in PCT Appln. No. PCT/US2006/022767.
Search Report and Written Opinion mailed Sep. 13, 2007 in PCT Appln. No. PCT/US2006/024217.
Search Report and Written Opinion mailed Sep. 17, 2007 in PCT Appln. No. PCT/US2006/022787.
Search Report and Written Opinion mailed Sep. 5, 2007 in PCT Appln. No. PCT/US2006/027428.

Search Report and Written Opinion mailed Sep. 17, 2007 in PCT Appln. No. PCT/US2006/022689.
U.S. Appl. No. 11/418,082, filed May 5, 2006, Gorrell et al.
J. C. Palais, "Fiber optic communications," Prentice Hall, New Jersey, 1998, pp. 156-158.
Search Report and Written Opinion mailed Dec. 20, 2007 in PCT Appln. No. PCT/US2006/022771.
Search Report and Written Opinion mailed Jan. 31, 2008 in PCT Appln. No. PCT/US2006/027427.
Search Report and Written Opinion mailed Jan. 8, 2008 in PCT Appln. No. PCT/US2006/028741.
Search Report and Written Opinion mailed Mar. 11, 2008 in PCT Appln. No. PCT/US2006/022679.
Lee Kwang-Cheol et al., "Deep X-Ray Mask with Integrated Actuator for 3D Microfabrication", Conference: Pacific Rim Workshop on Transducers and Micro/Nano Technologies, (Xiamen CHN), Jul. 22, 2002.
Markoff, John, "A Chip That Can Transfer Data Using Laser Light," The New York Times, Sep. 18, 2006.
S.M. Sze, "Semiconductor Devices Physics and Technology", 2nd Edition, Chapters 9 and 12, Copyright 1985, 2002.
Search Report and Written Opinion mailed Feb. 12, 2007 in PCT Appln. No. PCT/US2006/022682.
Search Report and Written Opinion mailed Feb. 20, 2007 in PCT Appln. No. PCT/US2006/022676.
Search Report and Written Opinion mailed Feb. 20, 2007 in PCT Appln. No. PCT/US2006/022772.
Search Report and Written Opinion mailed Feb. 20, 2007 in PCT Appln. No. PCT/US2006/022780.
Search Report and Written Opinion mailed Feb. 21, 2007 in PCT Appln. No. PCT/US2006/022684.
Search Report and Written Opinion mailed Jan. 17, 2007 in PCT Appln. No. PCT/US2006/022777.
Search Report and Written Opinion mailed Jan. 23, 2007 in PCT Appln. No. PCT/US2006/022781.
Search Report and Written Opinion mailed Mar. 7, 2007 in PCT Appln. No. PCT/US2006/022775.
Speller et al., "A Low-Noise MEMS Accelerometer for Unattended Ground Sensor Applications", Applied MEMS Inc., 12200 Parc Crest, Stafford, TX, USA 77477.
Thurn-Albrecht et al., "Ultrahigh-Density Nanowire Arrays Grown in Self-Assembled Diblock Copolymer Templates", Science 290. 5499, Dec. 15, 2000, pp. 2126-2129.
International Search Report and Written Opinion mailed Nov. 23, 2007 in International Application No. PCT/US2006/022786.
Search Report and Written Opinion mailed Oct. 25, 2007 in PCT Appln. No. PCT/US2006/022687.
Search Report and Written Opinion mailed Oct. 26, 2007 in PCT Appln. No. PCT/US2006/022675.
Search Report and Written Opinion mailed Sep. 21, 2007 in PCT Appln. No. PCT/US2006/022688.
Search Report and Written Opinion mailed Sep. 25, 2007 in PCT appln. No. PCT/US2006/022681.
Search Report and Written Opinion mailed Sep. 26, 2007 in PCT Appln. No. PCT/US2006/024218.
Search Report and Written Opinion mailed Apr. 23, 2008 in PCT Appln. No. PCT/US2006/022678.
Search Report and Written Opinion mailed Apr. 3, 2008 in PCT Appln. No. PCT/US2006/027429.
Search Report and Written Opinion mailed Jun. 18, 2008 in PCT Appln. No. PCT/US2006/027430.
Search Report and Written Opinion mailed Jun. 3, 2008 in PCT Appln. No. PCT/US2006/022783.
Search Report and Written Opinion mailed Mar. 24, 2008 in PCT Appln. No. PCT/US2006/022677.
Search Report and Written Opinion mailed Mar. 24, 2008 in PCT Appln. No. PCT/US2006/022784.
Search Report and Written Opinion mailed May 2, 2008 in PCT Appl. No. PCT/US2006/023280.
Search Report and Written Opinion mailed May 21, 2008 in PCT Appln. No. PCT/US2006/023279.
Search Report and Written Opinion mailed May 22, 2008 in PCT Appln. No. PCT/US2006/022685.

"Array of Nanoklystrons for Frequency Agility or Redundancy," NASA's Jet Propulsion Laboratory, NASA Tech Briefs, NPO-21033. 2001.
"Hardware Development Programs," Calabazas Creek Research, Inc. found at http://calcreek.com/hardware.html, Copyright 2001-2003.
"Antenna Arrays." May 18, 2002. www.tpub.com/content/neets/14183/css/14183_159.htm.
"Diffraction Grating," hyperphysics.phy-astr.gsu.edu/hbase/phyopt/grating.html Oct. 2005.
Alford, T.L. et al., "Advanced silver-based metallization patterning for ULSI applications," Microelectronic Engineering 55, 2001, pp. 383-388, Elsevier Science B.V.
Amato, Ivan, "An Everyman's Free-Electron Laser?" Science, New Series, Oct. 16, 1992, p. 401, vol. 258 No. 5081, American Association for the Advancement of Science.
Andrews, H.L. et al., "Dispersion and Attenuation in a Smith-Purcell Free Electron Laser," The American Physical Society, Physical Review Special Topics—Accelerators and Beams 8 (2005), pp. 050703-1-050703-9.
Backe, H. et al. "Investigation of Far-Infrared Smith-Purcell Radiation at the 3.41 MeV Electron Injector Linac of the Mainz Microtron MAMI," Institut fur Kernphysik, Univeristat Mainz, D-55099, Mainz Germany, 2004.
Bakhtyari, A. et al., "Horn Resonator Boosts Miniature Free-Electron Laser Power," Applied Physics Letters, May 12, 2003, pp. 3150-3152, vol. 82, No. 19, American Institute of Physics.
Bakhtyari, Dr. Arash, "Gain Mechanism in a Smith-Purcell MicroFEL," Abstract, Department of Physics and Astronomy, Dartmouth College, Mar. 2002.
Bhattacharjee, Sudeep et al., "Folded Waveguide Traveling-Wave Tube Sources for Terahertz Radiation." IEEE Transactions on Plasma Science, vol. 32. No. 3, Jun. 2004, pp. 1002-1014.
Booske, J.H. et al., "Microfabricated TWTs as High Power, Wideband Sources of THz Radiation" Feb. 2002.
Brau, C.A. et al., "Gain and Coherent Radiation from a Smith-Purcell Free Electron Laser," Proceedings of the 2004 FEL Conference, pp. 278-281.
Brownell, J.H. et al., "Improved µFEL Performance with Novel Resonator," Jan. 7, 2005, from website: www.frascati.enea.it/thz-bridge/workshop/presentations/Wednesdays/We-07-Brownell.ppt.
Brownell, J.H. et al., "The Angular Distribution of the Power Produced by Smith-Purcell Radiation," J. Phys. D: Appl. Phys. 1997, pp. 2478-2481, vol. 30, IOP Publishing Ltd., United Kingdom.
Chuang, S.L. et al., "Enhancement of Smith-Purcell Radiation from a Grating with Surface-Plasmon Excitation," Journal of the Optical Society of America, Jun. 1984, pp. 672-676, vol. 1 No. 6, Optical Society of America.
Chuang, S.L. et al., "Smith-Purcell Radiation from a Charge Moving Above a Penetrable Grating," IEEE MTT-S Digest, 1983, pp. 405-406, IEEE.
Far-IR, Sub-MM & MM Detector Technology Workshop list of manuscripts, session 6 2002.
Feltz, W.F. et al., "Near-Continuous Profiling of Temperature, Moisture, and Atmospheric Stability Using the Atmospheric Emitted Radiance Interferometer (AERI)," Journal of Applied Meteorology, May 2003, vol. 42 No. 5, H.W. Wilson Company, pp. 584-597.
Freund, H.P. et al., "Linearized Field Theory of a Smith-Purcell Traveling Wave Tube," IEEE Transactions on Plasma Science, Jun. 2004, pp. 1015-1027, vol. 32 No. 3, IEEE.
Gallerano, G.P. et al., "Overview of Terahertz Radiation Sources," Proceedings of the 2004 FEL Conference, pp. 216-221.
Goldstein, M. et al., "Demonstration of a Micro Far-Infrared Smith-Purcell Emitter," Applied Physics Letters, Jul. 28, 1997, pp. 452-454, vol. 71 No. 4, American Institute of Physics.
Gover, A. et al., "Angular Radiation Pattern of Smith-Purcell Radiation," Journal of the Optical Society of America, Oct. 1984, pp. 723-728, vol. 1 No. 5, Optical Society of America.
Grishin, Yu. A. et al., "Pulsed Orotron—A New Microwave Source for Submillimeter Pulse High-Field Electron Paramagnetic Resonance Spectroscopy," Review of Scientific Instruments, Sep. 2004, pp. 2926-2936, vol. 75 No. 9, American Institute of Physics.

Ishizuka, H. et al., "Smith-Purcell Experiment Utilizing a Field-Emitter Array Cathode: Measurements of Radiation," Nuclear Instruments and Methods in Physics Research, 2001, pp. 593-598, A 475, Elsevier Science B.V.

Ishizuka, H. et al., "Smith-Purcell Radiation Experiment Using a Field-Emission Array Cathode," Nuclear Instruments and Methods in Physics Research, 2000, pp. 276-280, A 445, Elsevier Science B.V.

Ives, Lawrence et al., "Development of Backward Wave Oscillators for Terahertz Applications," Terahertz for Military and Security Applications, Proceedings of SPIE vol. 5070 (2003), pp. 71-82.

Ives, R. Lawrence, "IVEC Summary, Session 2, Sources I" 2002.

Jonietz, Erika, "Nano Antenna Gold nanospheres show path to all-optical computing," Technology Review, Dec. 2005/Jan. 2006, p. 32.

Joo, Youngcheol et al., "Air Cooling of IC Chip with Novel Microchannels Monolithically Formed on Chip Front Surface," Cooling and Thermal Design of Electronic Systems (HTD-vol. 319 & EEP-vol. 15), International Mechanical Engineering Congress and Exposition, San Francisco, CA Nov. 1995 pp. 117-121.

Joo, Youngcheol et al., "Fabrication of Monolithic Microchannels for IC Chip Cooling," 1995, Mechanical, Aerospace and Nuclear Engineering Department, University of California at Los Angeles.

Jung, K.B. et al., "Patterning of Cu, Co, Fe, and Ag for magnetic nanostructures," J. Vac. Sci. Technol. A 15(3), May/Jun. 1997, pp. 1780-1784.

Kapp, Oscar H. et al., "Modification of a Scanning Electron Microscope to Produce Smith-Purcell Radiation," Review of Scientific Instruments, Nov. 2004, pp. 4732-4741, vol. 75 No. 11, American Institute of Physics.

Kiener, C. et al., "Investigation of the Mean Free Path of Hot Electrons in GaAs/AlGaAs Heterostructures," Semicond. Sci. Technol., 1994, pp. 193-197, vol. 9, IOP Publishing Ltd., United Kingdom.

Kim, Shang Hoon, "Quantum Mechanical Theory of Free-Electron Two-Quantum Stark Emission Driven by Transverse Motion," Journal of the Physical Society of Japan, Aug. 1993, vol. 62 No. 8, pp. 2528-2532.

Korbly, S.E. et al., "Progress on a Smith-Purcell Radiation Bunch Length Diagnostic," Plasma Science and Fusion Center, MIT, Cambridge, MA, Proc. 2003 Particle Accelerator Conference.

Kormann, T. et al., "A Photoelectron Source for the Study of Smith-Purcell Radiation" EPAC 1996.

Kube, G. et al., "Observation of Optical Smith-Purcell Radiation at an Electron Beam Energy of 855 MeV," Physical Review E, May 8, 2002, vol. 65, The American Physical Society, pp. 056501-1-056501-15.

Liu, Chuan Sheng, et al., "Stimulated Coherent Smith-Purcell Radiation from a Metallic Grating," IEEE Journal of Quantum Electronics, Oct. 1999, pp. 1386-1389, vol. 35, No. 10, IEEE.

Manohara, Harish et al., "Field Emission Testing of Carbon Nanotubes for THz Frequency Vacuum Microtube Sources." Abstract. Dec. 2003. from SPIEWEb.

Manohara, Harish M. et al., "Design and Fabrication of a THz Nanoklystron" Apr. 2002.

Manohara, Harish M. et al., "Design and Fabrication of a THz Nanoklystron" (www.sofia.usra.edu/det_workshop/ posters/session 3/3-43manohara_poster.pdf), PowerPoint Presentation, Apr. 2002.

McDaniel, James C. et al., "Smith-Purcell Radiation in the High Conductivity and Plasma Frequency Limits," Applied Optics, Nov. 15, 1989, pp. 4924-4929, vol. 28 No. 22, Optical Society of America.

Meyer, Stephan, "Far IR, Sub-MM & MM Detector Technology Workshop Summary," Oct. 2002. (may date the Manohara documents).

Mokhoff, Nicolas, "Optical-speed light detector promises fast space talk," EETimes Online, Mar. 20, 2006, from website: www.eetimes.com/showArticle.jhtml?articleID=183701047.

Nguyen, Phucanh et al., "Novel technique to pattern silver using CF4 and CF4/O2 glow discharges," J.Vac. Sci. Technol. B 19(1), Jan./Feb. 2001, American Vacuum Society, pp. 158-165.

Nguyen, Phucanh et al., "Reactive ion etch of patterned and blanket silver thin films in Cl2/O2 and O2 glow discharges," J. Vac. Sci, Technol. B. 17 (5), Sep./Oct. 1999, American Vacuum Society, pp. 2204-2209.

Photonics Research, "Surface-Plasmon-Enhanced Random Laser Demonstrated," Phototonics Spectra, Feb. 2005, pp. 112-113.

Potylitsin, A.P., "Resonant Diffraction Radiation and Smith-Purcell Effect," (Abstract), arXiv: physics/9803043 v2 Apr. 13, 1998.

Potylitsyn, A.P., "Resonant Diffraction Radiation and Smith-Purcell Effect," Physics Letters A, Feb. 2, 1998, pp. 112-116, A 238, Elsevier Science B.V.

S. Hoogland et al., "A solution-processed 1.53 µm quantum dot laser with temperature-invariant emission wavelength," Optics Express, vol. 14, No. 8, Apr. 17, 2006, pp. 3273-3281.

Savilov, Andrey V., "Stimulated Wave Scattering in the Smith-Purcell FEL," IEEE Transactions on Plasma Science, Oct. 2001, pp. 820-823, vol. 29 No. 5, IEEE.

Schachter, Levi et al., "Smith-Purcell Oscillator in an Exponential Gain Regime," Journal of Applied Physics, Apr. 15, 1998, pp. 3267-3269, vol. 65 No. 8, American Institute of Physics.

Schachter, Levi, "Influence of the Guiding Magnetic Field on the Performance of a Smith-Purcell Amplifier Operating in the Weak Compton Regime," Journal of the Optical Society of America, May 1990, pp. 873-876, vol. 7 No. 5, Optical Society of America.

Schachter, Levi, "The Influence of the Guided Magnetic Field on the Performance of a Smith-Purcell Amplifier Operating in the Strong Compton Regime," Journal of Applied Physics, Apr. 15, 1990, pp. 3582-3592, vol. 67 No. 8, American Institute of Physics.

Shih, I. et al., "Experimental Investigations of Smith-Purcell Radiation," Journal of the Optical Society of America, Mar. 1990, pp. 351-356, vol. 7, No. 3, Optical Society of America.

Shih, I. et al., "Measurements of Smith-Purcell Radiation," Journal of the Optical Society of America, Mar. 1990, pp. 345-350, vol. 7 No. 3, Optical Society of America.

Swartz, J.C. et al., "THz-FIR Grating Coupled Radiation Source," Plasma Science, 1998. 1D02, p. 126.

Temkin, Richard, "Scanning with Ease Through the Far Infrared," Science, New Series, May 8, 1998, p. 854, vol. 280, No. 5365, American Association for the Advancement of Science.

Walsh, J.E., et al., 1999. From website: http://www.ieee.org/organizations/pubs/newsletters/leos/feb99/hot2.htm.

Wentworth, Stuart M. et al., "Far-Infrared Composite Microbolometers," IEEE MTT-S Digest, 1990, pp. 1309-1310.

Yamamoto, N. et al., "Photon Emission From Silver Particles Induced by a High-Energy Electron Beam," Physical Review B, Nov. 6, 2001, pp. 205419-1-205419-9, vol. 64, The American Physical Society.

Yokoo, K. et al., "Smith-Purcell Radiation at Optical Wavelength Using a Field-Emitter Array," Technical Digest of IVMC, 2003, pp. 77-78.

Zeng, Yuxiao et al., "Processing and encapsulation of silver patterns by using reactive ion etch and ammonia anneal," Materials Chemistry and Physics 66, 2000, pp. 77-82.

Neo et al., "Smith-Purcell Radiation from Ultraviolet to Infrared Using a Si-field Emitter" Vacuum Electronics Conference, 2007, IVEC '07, IEEE International May 2007.

Search Report and Written Opinion mailed Jul. 14, 2008 in PCT Appln. No. PCT/US2006/022773.

Search Report and Written Opinion mailed Aug. 19, 2008 in PCT Appln. No. PCT/US2007/008363.

Search Report and Written Opinion mailed Jul. 16, 2008 in PCT Appln. No. PCT/US2006/022766.

Search Report and Written Opinion mailed Jul. 28, 2008 in PCT Appln. No. PCT/US2006/022782.

Search Report and Written Opinion mailed Jul. 3, 2008 in PCT Appln. No. PCT/US2006/022690.

Search Report and Written Opinion mailed Jul. 3, 2008 in PCT Appln. No. PCT/US2006/022778.

Search Report and Written Opinion mailed Jul. 7, 2008 in PCT Appln. No. PCT/US2006/022686.

Search Report and Written Opinion mailed Jul. 7, 2008 in PCT Appln. No. PCT/US2006/022785.

Search Report and Written Opinion mailed Sep. 2, 2008 in PCT Appln. No. PCT/US2006/022769.

Search Report and Written Opinion mailed Sep. 26, 2008 in PCT Appln. No. PCT/US2007/00053.

Search Report and Written Opinion mailed Sep. 3, 2008 in PCT Appln. No. PCT/US2006/022770.

Corcoran, Elizabeth, "Ride the Light," Forbes Magazine, Apr. 11, 2005, pg. 68-70.
Saraph, Girish P. et al., "Design of a Single-Stage Depressed Collector for High-Power, Pulsed Gyroklystrom Amplifiers," IEEE Trabsactions on Electron Devices, vol. 45, no. 4, Apr. 1998, pp. 986-990.
"Notice of Allowability" mailed on Jan. 17, 2008 in U.S. Appl. No. 11/418,082 filed May 5, 2006.
Mar. 24, 2006 PTO Office Action in U.S. Appl. No. 10/917,511.
Mar. 25, 2008 PTO Office Action in U.S. Appl. No. 11/411,131.
Apr. 8, 2008 PTO Office Action in U.S. Appl. No. 11/325,571.
Apr. 17, 2008 Response to PTO Office Action of Dec. 20, 2007 in U.S. Appl. No. 11/418,087.
Apr. 19, 2007 Response to PTO Office Action of Jan. 17, 2007 in U.S. Appl. No. 11/418,082.
May 10, 2005 PTO Office Action in U.S. Appl. No. 10/917,511.
May 21, 2007 PTO Office Action in U.S. Appl. No. 11/418,087.
May 26, 2006 Response to PTO Office Action of Mar. 24, 2006 in U.S. Appl. No. 10/917,511.
Jun. 16, 2008 Response to PTO Office Action of Dec. 14, 2007 in U.S. Appl. No. 11/418,264.
Jun. 20, 2008 PTO Office Action in U.S. Appl. No. 11/418,083.
Jun. 20, 2008 Response to PTO Office Action of Mar. 25, 2008 in U.S. Appl. No. 11/411,131.
Aug. 14, 2006 PTO Office Action in U.S. Appl. No. 10/917,511.
Sep. 1, 2006 Response to PTO Office Action of Aug. 14, 2006 in U.S. Appl. No. 10/917,511.
Sep. 12, 2005 Response to PTO Office Action of May 10, 2005 in U.S. Appl. No. 10/917,511.
Sep. 14, 2007 PTO Office Action in U.S. Appl. No. 11/411,131.
Oct. 19, 2007 Response to PTO Office Action of May 21, 2007 in U.S. Appl. No. 11/418,087.
Dec. 4, 2006 PTO Office Action in U.S. Appl. No. 11/418,087.
Dec. 14, 2007 PTO Office Action in U.S. Appl. No. 11/418,264.
Dec. 14, 2007 Response to PTO Office Action of Sep. 14, 2007 in U.S. Appl. No. 11/411,131.
Dec. 18, 2008 Response to PTO Office Action of Jun. 20, 2008 in U.S. Appl. No. 11/418,083.
Dec. 20, 2007 PTO Office Action in U.S. Appl. No. 11/418,087.
European Search Report mailed Mar. 3, 2009 in European Application No. 06852028.7.
U.S. Appl. No. 11/203,407 - Nov. 13, 2008 PTO Office Action.
U.S. Appl. No. 11/238,991 - Dec. 6, 2006 PTO Office Action.
U.S. Appl. No. 11/238,991 - Jun. 6, 2007 Response to PTO Office Action of Dec. 6, 2006.
U.S. Appl. No. 11/238,991 - Sep. 10, 2007 PTO Office Action.
U.S. Appl. No. 11/238,991 - Mar. 6, 2008 Response to PTO Office Action of Sep. 10, 2007.
U.S. Appl. No. 11/239,991 - Jun. 27, 2008 PTO Office Action.
U.S. Appl. No. 11/238,991 - Dec. 29, 2008 Response to PTO Office Action of Jun. 27, 2008.
U.S. Appl. No. 11/238,991 - Mar. 24, 2009 PTO Office Action.
U.S. Appl. No. 11/243,477 - Apr. 25, 2008 PTO Office Action.
U.S. Appl. No. 11/243,477 - Oct. 24, 2008 Response to PTO Office Action of Apr. 25, 2008.
U.S. Appl. No. 11/243,477 - Jan. 7, 2009 PTO Office Action.
U.S. Appl. No. 11/325,448 - Jun. 16, 2008 PTO Office Action.
U.S. Appl. No. 11/325,448 - Dec. 16, 2008 Response to PTO Office Action of Jun. 16, 2008.
U.S.Appl. No. 11/325,534 - Jun. 6, 2008 PTO Office Action.
U.S. Appl. No. 11/325,534 - Oct. 15, 2008 Response to PTO Office Action of Jun. 11, 2008.
U.S. Appl. No. 11/353,208 - Jan. 15, 2008 PTO Office Action.
U.S. Appl. No. 11/353,208 - Mar. 17, 2008 PTO Office Action.
U.S. Appl. No. 11/353,208 - Sep. 15, 2008 Response to PTO Office Action of Mar. 17, 2008.
U.S. Appl. No. 11/353,208 - Dec. 24, 2008 PTO Office Action.
U.S. Appl. No. 11/353,208 - Dec. 30, 2008 Response to PTO Office Action of Dec. 24, 2008.
U.S. Appl. No. 11/400,280 - Oct. 16, 2008 PTO Office Action.
U.S. Appl. No. 11/400,280 - Oct. 24, 2008 Response to PTO Office Action of Oct. 16, 2008.
U.S. Appl. No. 11/410,905 - Sep. 26, 2008 PTO Office Action.
U.S. Appl. No. 11/410,905 - Mar. 26, 2009 Response to PTO Office Action of Sep. 26, 2008.
U.S. Appl. No. 11/410,924 - Mar. 6, 2009 PTO Office Action.
U.S. Appl. No. 11/411,120 - Mar. 19, 2009 PTO Office Action.
U.S. Appl. No. 11/411,129 - Jan. 16, 2009 Office Action.
U.S. Appl. No. 11/411,130 - May 1, 2008 PTO Office Action.
U.S. Appl. No. 11/411,130 - Oct. 29, 2008 Response to PTO Office Action of May 1, 2008.
U.S. Appl. No. 11/417,129 - Jul. 11, 2007 PTO Office Action.
U.S. Appl. No. 11/417,129 - Dec. 17, 2007 Response to PTO Office Action of Jul. 11, 2007.
U.S. Appl. No. 11/417,129 - Dec. 20, 2007 Response to PTO Office Action of Jul. 11, 2007.
U.S. Appl. No. 11/417,129 - Apr. 17, 2008 PTO Office Action.
U.S. Appl. No. 11/417,129 - Jun. 19, 2008 Response to PTO Office Action of Apr. 17, 2008.
U.S. Appl. No. 11/418,079 - Apr. 11, 2008 PTO Office Action.
U.S. Appl. No. 11/418,079 - Oct. 7, 2008 Response to PTO Office Action of Apr. 11, 2008.
U.S. Appl. No. 11/418,079 - Feb. 12, 2009 PTO Office Action.
U.S. Appl. No. 11/418,080 - Mar. 18, 2009 PTO Office Action.
U.S. Appl. No. 11/418,082 - Jan. 17, 2007 PTO Office Action.
U.S. Appl. No. 11/418,084 - Nov. 5, 2007 PTO Office Action.
U.S. Appl. No. 11/418,084 - May 5, 2008 Response to PTO Office Action of Nov. 5, 2007.
U.S. Appl. No. 11/418,084 - Aug. 19, 2008 PTO Office Action.
U.S. Appl. No. 11/418,084 - Feb. 19, 2009 Response to PTO Office Action of Aug. 19, 2008.
U.S. Appl. No. 11/418,085 - Aug. 10, 2007 PTO Office Action.
U.S. Appl. No. 11/418,085 - Nov. 13, 2007 Response to PTO Office Action of Aug. 10, 2007.
U.S. Appl. No. 11/418,085 - Feb. 12, 2008 PTO Office Action.
U.S. Appl. No. 11/418,085 - Aug. 12, 2008 Response to PTO Office Action of Feb. 12, 2008.
U.S. Appl. No. 11/418,085 - Sep. 16, 2008 PTO Office Ation.
U.S. Appl. No. 11/418,085 - Mar. 6, 2009 Response to PTO Office Action of Sep. 16, 2009.
U.S. Appl. No. 11/418,087 - Dec. 29, 2006 Response to PTO Office Action of Dec. 4, 2006.
U.S. Appl. No. 11/418,087 - Feb. 15, 2007 PTO Office Action.
U.S. Appl. No. 11/418,087 - Mar. 6, 2007 Response to PTO Office Action of Feb. 15, 2007.
U.S. Appl. No. 11/418,088 - Jun. 9, 2008 PTO Office Action.
U.S. Appl. No. 11/418,088 - Dec. 8, 2008 Response to PTO Office Action of Jun. 9, 2008.
U.S. Appl. No. 11/418,089 - Mar. 21, 2008 PTO Office Action.
U.S. Appl. No. 11/418,089 - Jun. 23, 2008 Response to PTO Office Action of Mar. 21, 2008.
U.S. Appl. No. 11/418,089 - Sep. 30, 2008 PTO Office Action.
U.S. Appl. No. 11/418,089 - Mar. 30, 2009 Response to PTO Office Action of Sep. 30, 2008.
U.S. Appl. No. 11/418,091 - Jul. 30, 2007 PTO Office Action.
U.S. Appl. No. 11/418,091 - Nov. 27, 2007 Response to PTO Office Action of Jul. 30, 2007.
U.S. Appl. No. 11/418,091 - Feb. 26, 2008 PTO Office Action.
U.S. Appl. No. 11/418,097 - Jun. 2, 2008 PTO Office Action.
U.S. Appl. No. 11/418,097 - Dec. 2, 2008 Response to PTO Office Action of Jun. 2, 2008.
U.S. Appl No. 11/418,097 - Feb. 18, 2008 PTO Office Action.
U.S. Appl. No. 11/418,099 - Jun. 23, 2008 PTO Office Action.
U.S. Appl. No. 11/418,099 - Dec. 23, 2008 Response to PTO Office Action of Jun. 23, 2008.
U.S. Appl. No. 11/418,100 - Jan. 12, 2009 PTO Office Action.
U.S. Appl. No. 11/418,123 - Apr. 25, 2008 PTO Office Action.
U.S. Appl. No. 11/418,123 - Oct. 27, 2008 Response to PTO Office Action of Apr. 25, 2008.
U.S. Appl. No. 11/418,123 - Jan. 26, 2009 PTO Office Action.
U.S. Appl. No. 11/418,124 - Oct. 1, 2008 PTO Office Action.
U.S. Appl. No. 11/418,124 - Feb. 2 2009 Response to PTO Office Action of Oct.1, 2008.
U.S. Appl. No. 11/418,124 - Mar. 13, 2009 PTO Office Action.
U.S. Appl. No. 11/418,126 - Oct. 12, 2006 PTO Office Action.

U.S. Appl. No. 11/418,126 - Feb. 12, 2007 Response to PTO Office Action of Oct. 12, 2006 (Redacted).
U.S. Appl. No. 11/418,126 - Jun. 6, 2007 PTO Office Action.
U.S. Appl. No. 11/418,126 - Aug. 6, 2007 Response to PTO Office Action of Jun. 6, 2007.
U.S. Appl. No. 11/418,126 - Nov. 2, 2007 PTO Office Action.
U.S. Appl. No. 11/418,126 - Feb. 22, 2008 Response to PTO Office Action of Nov. 2, 2007.
U.S. Appl No. 11/418,126 - Jun. 10, 2008 PTO Office Action.
U.S. Appl. No. 11/418,127 - Apr. 2, 2009 Office Action.
U.S. Appl. No. 11/418,128 - Dec. 16, 2008 PTO Office Action.
U.S. Appl. No. 11/418,128 - Dec. 31, 2008 Response to PTO Office Action of Dec. 16, 2008.
U.S. Appl No. 11/418,128 - Feb. 17, 2009 PTO Office Action.
U.S. Appl. No. 11/418,129 - Dec. 16, 2008 Office Action.
U.S. Appl. No. 11/418,129 - Dec. 31, 2008 Response to PTO Office Action of Dec. 16, 2008.
U.S. Appl. No. 11/418,244 - Nov. 25, 2008 Response to PTO Office Action of Jul. 1, 2008.
U.S. Appl. No. 11/418,263 - Sep. 24, 2008 PTO Office Action.
U.S. Appl. No. 11/418,263 - Dec. 24, 2008 Response to PTO Office Action of Sep. 24, 2008.
U.S. Appl. No. 11/418,263 - Mar. 9, 2009 PTO Office Action.
U.S. Appl. No. 11/418,315 - Mar. 31, 2008 PTO Office Action.
U.S. Appl. No. 11/418,318 - Mar. 31, 2009 PTO Office Action.
U.S. Appl. No. 11/441,219 - Jan. 7, 2009 PTO Office Action.
U.S. Appl. No. 11/522,929 - Oct. 22, 2007 PTO Office Action.
U.S. Appl. No. 11/522,929 - Feb. 21, 2008 Response to PTO Office Action of Oct. 22, 2007.
U.S. Appl. No. 11/641,678 - Jul. 22, 2008 PTO Office Action.
U.S. Appl. No. 11/641,678 - Jan. 22, 2008 Response to Office Action of Jul. 22, 2008.
U.S. Appl. No. 11/711,000 - Mar. 6, 2009 PTO Office Action.
U.S. Appl. No. 11/716,552 - Feb. 12, 2009 Response to PTO Office Action of Feb. 9, 2009.
U.S. Appl. No. 11/716,552 - Jul. 3, 2008 PTO Office Action.

* cited by examiner

Fig. 1

Fig. 2

INTEGRATION OF ELECTROMAGNETIC DETECTOR ON INTEGRATED CHIP

COPYRIGHT NOTICE

A portion of the disclosure of this patent document contains material which is subject to copyright or mask work protection. The copyright or mask work owner has no objection to the facsimile reproduction by anyone of the patent document or the patent disclosure, as it appears in the Patent and Trademark Office patent file or records, but otherwise reserves all copyright or mask work rights whatsoever.

CROSS-REFERENCE TO RELATED APPLICATIONS

The present invention is related to the following co-pending U.S. Patent applications which are all commonly owned with the present application, the entire contents of each of which are incorporated herein by reference:
 (1) U.S. patent application Ser. No. 11/238,991, filed Sept. 30, 2005, entitled "Ultra-Small Resonating Charged Particle Beam Modulator";
 (2) U.S. patent application Ser. No. 10/917,511, filed on Aug. 13, 2004, entitled "Patterning Thin Metal Film by Dry Reactive Ion Etching";
 (3) U.S. application Ser. No. 11/203,407, filed on Aug. 15, 2005, entitled "Method Of Patterning Ultra-Small Structures";
 (4) U.S. application Ser. No. 11/243,476, filed on Oct. 5, 2005, entitled "Structures And Methods For Coupling Energy From An Electromagnetic Wave";
 (5) U.S. application Ser. No. 11/243,477, filed on Oct. 5, 2005, entitled "Electron beam induced resonance,"
 (6) U.S. application Ser. No. 11/325,448, entitled "Selectable Frequency Light Emitter from Single Metal Layer," filed Jan. 5, 2006;
 (7) U.S. application Ser. No. 11/325,432, entitled, "Matrix Array Display," filed Jan. 5, 2006,
 (8) U.S. application Ser. No. 11/410,905, entitled, "Coupling Light of Light Emitting Resonator to Waveguide," and filed Apr. 26, 2006;
 (9) U.S. application Ser. No. 11/411,120, entitled "Free Space Interchip Conmunication," and filed Apr. 26, 2006;
 (10) U.S. application Ser. No. 11/410,924, entitled, "Selectable Frequency EMR Emitter," filed Apr. 26, 2006;
 (11) U.S. application Ser. No. 11/418,126, entitled, "Multiplexed Optical Communication between Chips on A Multi-Chip Module," filed on even date herewith;
 (12) U.S. patent application Ser. No. 11/400,280, entitled "Resonant Detector for Optical Signals," filed Apr. 10, 2006;
 (13) U.S. patent application Ser. No. 11/418,318, entitled "Integration of Vacuum Microelectronic Device with Integrated Circuit," filed on even date herewith;
 (14) U.S. patent application Ser. No. 11/418,078, entitled "Coupling energy in a plasmon wave to an electron beam," filed on even date herewith.

FIELD OF THE DISCLOSURE

This relates to ultra-small electronic devices, and, more particularly, integrating such devices with integrated circuits and chips.

INTRODUCTION

Integrated circuits (ICs) are ubiquitous. While it is desirable to increase the functionality (such as inter-chip optical communications) of existing ICs, this is typically done through external devices and connections.

Various ultra-small resonant structures have been described in the related applications to perform a variety of functions, including optical data transfer functions. These ultra-small resonant devices are functionally compatible with standard ICs.

Related U.S. patent application Ser. No. 11/400,280, entitled "Resonant Detector for Optical Signals," filed Apr. 10, 2006, and which has been incorporated herein by reference, describes various ultra-small resonant detectors for optical signals. Related U.S. patent application Ser. No. 11/418,318, entitled "Integration of Vacuum Microelectronic Device with Integrated Circuit," filed on even date herewith, which has also been incorporated herein by reference, describes integrating ultra-small resonant structures with ICs. U.S. patent application Ser. No. 11/418,078, entitled "Coupling energy in a plasmon wave to an electron beam," filed on even date herewith, which has also been incorporated herein by reference, describes coupling energy in a plasmon wave to an electron beam using ultra-small resonant structures.

As noted in application Ser. No. 11/418,318, any of the devices described in applications Ser. Nos. 11/400,280 and/or 11/418,078, may be integrated with an IC.

BRIEF DESCRIPTION OF THE DRAWINGS

The following description, given with respect to the attached drawings, may be better understood with reference to the non-limiting examples of the drawings, in which.

THE PRESENTLY PREFERRED EXEMPLARY EMBODIMENTS

Figure 1:
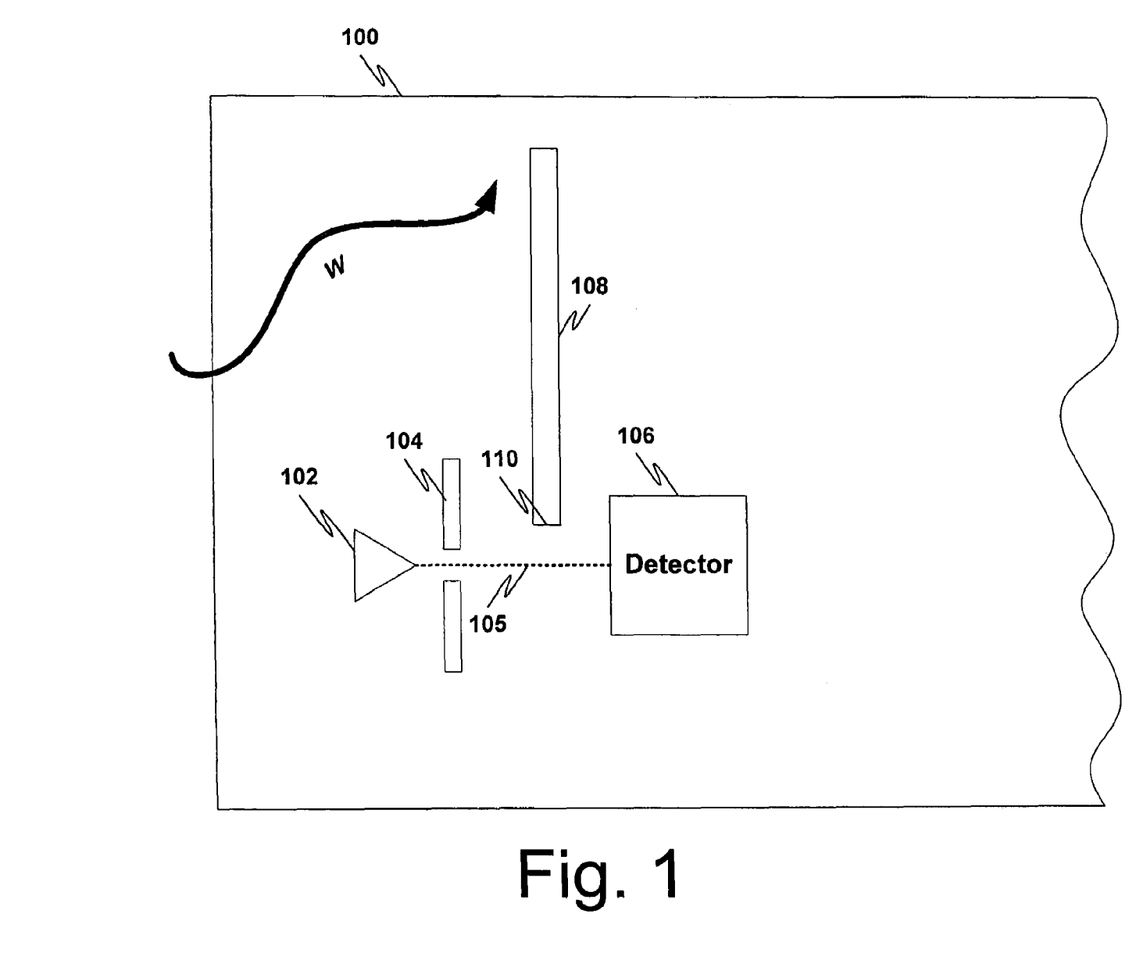
FIGS. 1-2 show ICs integrated with ultra-small electromagnetic ("EM") detector structures.
Figure 2:
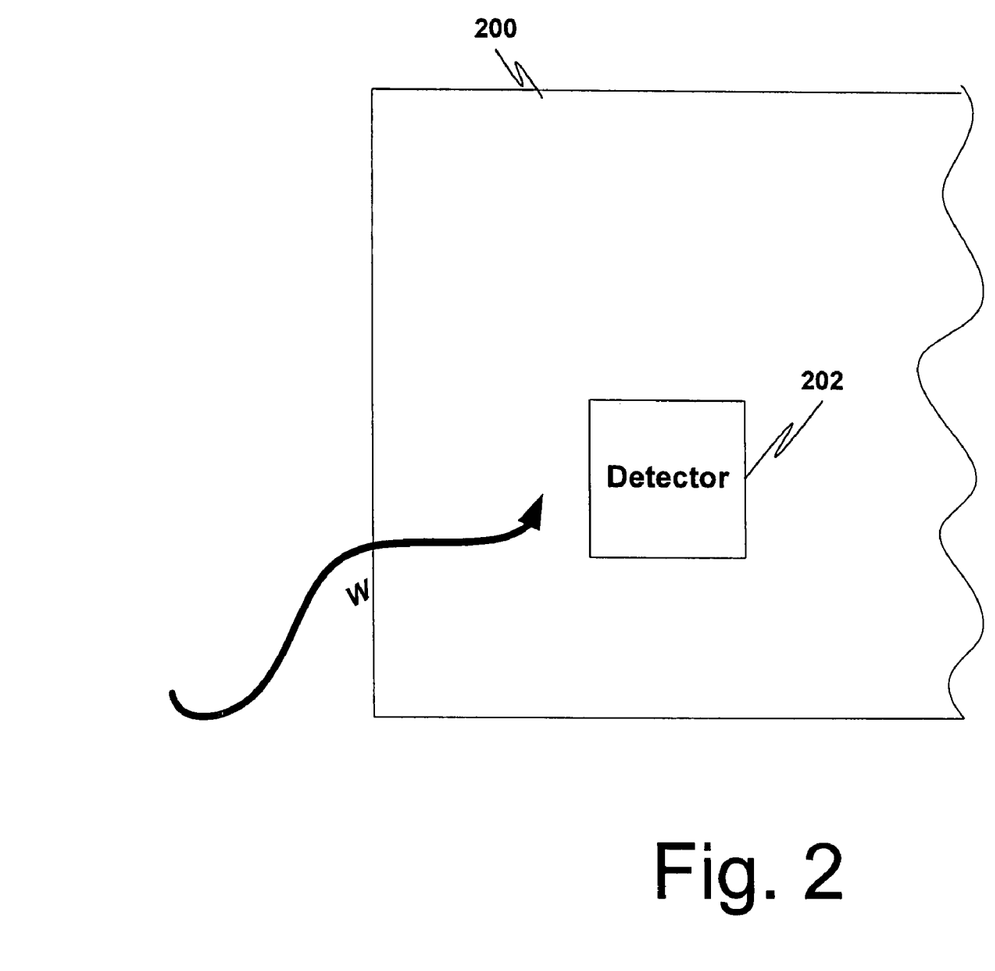

The Figure shows an integrated structure in which IC 100 is integrated with a structure consisting of a source of charged particles (e.g., cathode 102), anode and focusing deflector plates 104 and a detector system 106. The cathode emits a beam of charged particles 105 towards the detector system 106.

An ultra-small resonant structure ("URS"), e.g., transmission line, 108 (preferably a metal line) is disposed/formed on the IC 100. The URS 108 may be a line as described in related application Ser. No. 11/418,078, which has been incorporated herein by reference. The end (denoted 110 in the drawing) of the transmission line 108 is preferably pointed. The transmission line 108 may be straight or curved.

The source of charged particles 102 and corresponding detector 106 are positioned so that the beam of charged particles (denoted 105 in the drawing) generated by the source 102 is disrupted or deflected by a change in the magnetic and/or electric field surrounding the end 110 of the transmission line 108. Preferably the source of charged particles 102 and the corresponding detector are positioned near the end 110 of the transmission line 108. In some cases the beam 102 may be substantially perpendicular to a central axis of the transmission line 108.

The detector 106 is constructed and adapted to detect breaks or deflections of the beam 105. Those skilled in the art will realize, upon reading this description and the related U.S. application Ser. No. 11/400,280, that the detector 106 can provide a signal indicative of the detected plasmon waves to other circuitry (not shown). In particular, the detector 106 may provide such a signal to circuitry within the IC, e.g., in a manner described in related application Ser. No. 11/418,318.

The detector system 106 may be any detector system such as described in related application Ser. No. 11/400,280, which has been incorporated herein by reference, or it may be any other detector system.

Plasmon waves on the transmission line 108 travel in the direction of the end 110. As the waves reach the end 110, they cause disruption of a magnetic and/or electric field around the point which, in turn, deflects the particle beam 102. The detector 106 detects the deflection and thereby recognizes the presence and duration of the plasmon waves. Plasmon waves will travel along the side surface of the transmission line 108 and along its top surface.

Plasmon waves may travel in the transmission line 108 for a variety of reasons, e.g., because of a light wave (W) incident on the transmission line. However, this system contemplates using a plasmon wave detector described herein, regardless of the source or cause of the wave. The plasmon wave may contain or be indicative of a data signal.

Although the transmission line is preferably metal, those skilled in the art will realize, upon reading this description, that the transmission line may be formed of other non-metallic substances or of a combination of metallic and non-metallic substances. For example, the transmission line may comprise silver (Ag).

The IC 100 may be any IC formed, e.g., with conventional semiconductor processing. The IC 100 may be, e.g., silicon or a compound such as GaAs, GaN, InP, etc.

Those skilled in the art will realize upon reading this description that the end of the transmission line does not have to have a pointed end. Further, the detector does not have to be at an end of the line, although such embodiments are presently considered to increase the field strength and thus make detection easier. For example, the emitter and detector are on opposite sides of the line, and the particle beam is deflected so that it passes adjacent to (in this case over), the transmission line.

The charged particle beam can include ions (positive or negative), electrons, protons and the like. The beam may be produced by any source, including, e.g., without limitation an ion gun, a thermionic filament, a tungsten filament, a cathode, a field-emission cathode, a planar vacuum triode, an electron-impact ionizer, a laser ionizer, a chemical ionizer, a thermal ionizer, or an ion-impact ionizer.

The structures described here can be formed on any external surface of the IC.

Since the particle beam emitted by the source of charged particles may be deflected by any electric or magnetic field, one or more shields or shielding structure(s) [not shown in the drawings] may be added to block out unwanted fields. Such shield(s) and/or shielding structure(s) may be formed on the same substrate as the source of charged particles and/or the transmission line so that only fields from the transmission line will interact with the particle beam.

Those skilled in the art will realize, upon reading this description, that the light wave W may encode data. The light wave may be generated by any source, including using ultra-small light-emitting resonant structures such as, e.g., disclosed in the related applications. In cases where the light wave W encodes data, the detector 106 may provide signals indicative of those data, e.g., to circuitry in the IC 100. In this manner, the URS 108 may be used to detect data encoded in a light wave W and to provide those data to other circuitry, e.g., in the IC.

Filters may be incorporated into the structure or added on top of the structure in order to filter the incoming EMR. Additionally, a reflective cavity may be constructed below the device to increase the absorption of incoming EMR. In some cases, the depth of the reflective cavity may be $\frac{1}{4}\lambda$, where $\lambda$ is the wavelength of the EMR to be detected.

Although only one ultra-small resonant EM detection structure is shown herein, those skilled in the art will realize, upon reading this description and the related U.S. application Ser. No. 11/400,280, that more than one ultra-small resonant structure may be formed on an IC.

The ultra-small resonant structures may be made, e.g., using techniques such as described in U.S. patent application Ser. No. 10/917,511, entitled "Patterning Thin Metal Film by Dry Reactive Ion Etching" and/or U.S. application Ser. No. 11/203,407, entitled "Method Of Patterning Ultra-Small Structures," both of which have been incorporated herein by reference.

The ultra-small resonant structures described are preferably under vacuum conditions during operation. Accordingly, in each of the exemplary embodiments described herein, the entire integrated package/circuit (which includes the IC and ultra-small resonant structures) may be vacuum packaged. Alternatively, the portion of the package containing at least the ultra-small resonant structure(s) should be vacuum packaged. Our invention does not require any particular kind of evacuation structure. Many known hermetic sealing techniques can be employed to ensure the vacuum condition remains during a reasonable lifespan of operation. We anticipate that the devices can be operated in a pressure up to atmospheric pressure if the mean free path of the electrons is longer than the device length at the operating pressure.

While certain configurations of structures have been illustrated for the purposes of presenting the basic structures of the present invention, one of ordinary skill in the art will appreciate that other variations are possible which would still fall within the scope of the appended claims. While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A method of making a device comprising:
   obtaining an integrated circuit (IC);
   forming one or more ultra-small resonant structures on an external surface of the IC, wherein the ultra-small resonant structures are constructed and adapted to respond to data encoded in an electromagnetic radiation (EMR) beam;
   forming a detection mechanism on said IC; and
   vacuum packaging at least said ultra-small resonant structure and said detection mechanism.

2. A method as in claim 1 wherein the one or more ultra-small resonant structures comprise a transmission line; and
   wherein the detection mechanism comprises:
   a generator mechanism constructed and adapted to generate a beam of charged particles along a path adjacent to the transmission line; and
   a detector microcircuit disposed along said path, at a location after said beam has gone past said line,
   wherein the generator mechanism and the detector microcircuit are disposed adjacent the transmission line and wherein a beam of charged particles from the generator mechanism to the detector microcircuit electrically couples a plasmon wave traveling along the metal transmission line to the detector microcircuit.

3. A method as in claim 1 wherein said step of vacuum packaging comprises:
hermetically sealing at least said ultra-small resonant structure and said detection mechanism.

4. A method as in any one of claims 1-3 wherein said one or more ultra-small resonant structures are constructed and adapted to detect electromagnetic radiation (EMR).

5. A method as in any one of claims 1-3 wherein said detection mechanism includes a source of charged particles.

6. A method as in claim 5 wherein said source of charged particles is selected from the group comprising:
an ion gun, a thermionic filament, tungsten filament, a cathode, a vacuum triode, a field emission cathode, a planar vacuum triode, an electron-impact ionizer, a laser ionizer, a chemical ionizer, a thermal ionizer, an ion-impact ionizer.

7. A method as in claim 5 wherein the charged particles are selected from the group comprising: positive ions, negative ions, electrons, and protons.

8. A method as in claim 1 further comprising:
electrically connecting said detection mechanism to said IC.

9. A device comprising:
an integrated circuit (IC);
at least one ultra-small resonant structure formed on an external surface of said IC; and
a detection mechanism, wherein the at least one ultra-small resonant structure and said detection mechanism are constructed and adapted to detect plasmons.

10. A device as in claim 9 wherein said at least one ultra-small resonant structure is vacuum packaged.

11. A device as in claim 9 wherein at least one of said detection mechanism is electrically connected to said IC.

12. A device as in claim 9 wherein said detection mechanism comprises a source of charged particles.

13. A device as in claim 12 wherein said source of charged particles is selected from the group comprising:
an ion gun, a thermionic filament, a cathode, vacuum triode, a planar vacuum triode, a field emission cathode, an electron-impact ionizer, a laser ionizer, a chemical ionizer, a thermal ionizer, an ion-impact ionizer.

14. A device as in claim 12 wherein the charged particles are selected from the group comprising: positive ions, negative ions, electrons, and protons.

15. A device as in claim 9 wherein the at least one ultra-small resonant structure comprises a transmission line;
and wherein the detection mechanism comprises:
a generator mechanism constructed and adapted to generate a beam of charged particles along a path adjacent to the transmission line; and
a detector microcircuit disposed along said path, at a location after said beam has gone past said line,
wherein the generator mechanism and the detector microcircuit are disposed adjacent transmission line and wherein a beam of charged particles from the generator mechanism to the detector microcircuit electrically couples the a plasmon wave traveling along the metal transmission line to the microcircuit.

16. A device comprising:
an integrated circuit (IC);
one or more structures formed on a surface of the IC and electrically connected to at least one electronic circuit in the IC, said structures including a plasmon detection device constructed and adapted to detect plasmons incident on the surface of the IC and to provide a signal indicative of the presence of said plasmons to said at least one electronic circuit.

17. A device as in claim 16 wherein said plasmon detection device comprises:
a transmission line;
a generator mechanism constructed and adapted to generate a beam of charged particles along a path adjacent to the transmission line; and
a detector microcircuit disposed along said path, at a location after said beam has gone past said line,
wherein the generator mechanism and the detector microcircuit are disposed adjacent transmission line and wherein a beam of charged particles from the generator mechanism to the detector microcircuit electrically couples the a plasmon wave traveling along the metal transmission line to the microcircuit.

18. A device as in claim 16 wherein at least some of said one or more of the transmission line, the generator mechanism and the detector microcircuit are vacuum packaged.

19. A method of communicating data to circuitry within an integrated circuit (IC), said data being encoded in an electromagnetic wave, the method comprising:
using a plasmon detector on a surface of said IC to detect the electromagnetic wave; and
providing a signal indicative of said wave to said circuitry.

* * * * *